United States Patent
Marquino et al.

(10) Patent No.: US 9,496,058 B2
(45) Date of Patent: Nov. 15, 2016

(54) DEVICES AND METHODS FOR MANAGING NONCONDENSABLE GASSES IN NUCLEAR POWER PLANTS

(71) Applicants: Wayne Marquino, Wilmington, NC (US);
(Continued)

(72) Inventors: Wayne Marquino, Wilmington, NC (US);
(Continued)

(73) Assignee: GE-HITACHI NUCLEAR ENERGY AMERICAS LLC, Wilmington, NC (US)

(*) Notice: Subject to any disclaimer, the term of this patent is extended or adjusted under 35 U.S.C. 154(b) by 74 days.

(21) Appl. No.: 14/543,286

(22) Filed: Nov. 17, 2014

(65) Prior Publication Data

US 2015/0146839 A1    May 28, 2015

Related U.S. Application Data

(62) Division of application No. 12/879,067, filed on Sep. 10, 2010, now Pat. No. 8,917,810.

(51) Int. Cl.
   *G21C 19/303* (2006.01)
   *G21C 9/06* (2006.01)
   (Continued)

(52) U.S. Cl.
   CPC ............ *G21C 19/303* (2013.01); *B01J 12/007* (2013.01); *G21C 9/06* (2013.01); *G21C 19/317* (2013.01);
   (Continued)

(58) Field of Classification Search
   USPC .................................................. 376/300, 301
   See application file for complete search history.

(56) References Cited

U.S. PATENT DOCUMENTS

| 4,741,879 A | * | 5/1988 | McLean et al. ............... 376/301 |
| 6,071,482 A | * | 6/2000 | Brockerhoff et al. ........ 422/173 |
| 2002/0172318 A1 | | 11/2002 | Brockerhoff et al. | |

FOREIGN PATENT DOCUMENTS

| JP | H06130170 A | 5/1994 |
| JP | H10221477 A | 8/1998 |

(Continued)

OTHER PUBLICATIONS

GE Hitachi Nuclear Energy letter to U.S. Nuclear Regulatory Commission dated Feb. 1, 2010, Including Enclosure 1 and Enclosure 2.

(Continued)

*Primary Examiner* — Sean P Burke
(74) *Attorney, Agent, or Firm* — Harness, Dickey & Pierce, P.L.C.

(57) ABSTRACT

Systems passively eliminate noncondensable gasses from facilities susceptible to damage from combustion of built-up noncondensable gasses, such as H2 and O2 in nuclear power plants, without the need for external power and/or moving parts. Systems include catalyst plates installed in a lower header of the Passive Containment Cooling System (PCCS) condenser, a catalyst packing member, and/or a catalyst coating on an interior surface of a condensation tube of the PCCS condenser or an annular outlet of the PCCS condenser. Structures may have surfaces or hydrophobic elements that inhibit water formation and promote contact with the noncondensable gas. Noncondensable gasses in a nuclear power plant are eliminated by installing and using the systems individually or in combination. An operating pressure of the PCCS condenser may be increased to facilitate recombination of noncondensable gasses therein.

11 Claims, 6 Drawing Sheets

(71) Applicants: Stephan C. Moen, Wilmington, NC (US); Richard M. Wachowiak, Wilmington, NC (US); John L. Gels, Wilmington, NC (US); Jesus Diaz-Quiroz, Wilmington, NC (US); John C. Burns, Jr., Wilmington, NC (US)

(72) Inventors: Stephan C. Moen, Wilmington, NC (US); Richard M. Wachowiak, Wilmington, NC (US); John L. Gels, Wilmington, NC (US); Jesus Diaz-Quiroz, Wilmington, NC (US); John C. Burns, Jr., Wilmington, NC (US)

(51) Int. Cl.
| | |
|---|---|
| *G21C 19/317* | (2006.01) |
| *B01J 12/00* | (2006.01) |
| *G21C 21/00* | (2006.01) |
| *B01D 53/86* | (2006.01) |
| *B01J 23/40* | (2006.01) |
| *B01J 35/04* | (2006.01) |

(52) U.S. Cl.
CPC ........... *G21C 21/00* (2013.01); *B01D 53/8671* (2013.01); *B01D 2255/1023* (2013.01); *B01D 2255/1025* (2013.01); *B01D 2257/108* (2013.01); *B01J 23/40* (2013.01); *B01J 35/04* (2013.01); *Y02E 30/40* (2013.01)

(56) References Cited

FOREIGN PATENT DOCUMENTS

| | | |
|---|---|---|
| JP | 2002509262 A | 3/2002 |
| JP | 2002286893 A | 10/2002 |

OTHER PUBLICATIONS

GE Hitachi Nuclear Energy, Licensing Topical Report, NEDO-33572, Revision 1, Class 1, "ESBWR ICS and PCCS Condenser Combustible Gas Mitigation and Structural Evaluation", May 2010.

European Search Report issued in connection wiyh EP Patent Application No. 11180409.2, Dec. 6, 2011.

Unofficial English Translation of a JPO Action issued in connection with corresponding JPO Patent Application No. 2011-192471dated Nov. 26, 2013.

Machine translation of 1998-221477A.

Makoto, Reactor Containment, Aug. 1998, English language translation of JP 10-221477, pp. 20.

\* cited by examiner

DEVICES AND METHODS FOR MANAGING NONCONDENSABLE GASSES IN NUCLEAR POWER PLANTS

PRIORITY STATEMENT

This application is a divisional of U.S. application Ser. No. 12/879,067 filed on Sep. 10, 2010, which is hereby incorporated by reference in its entirety.

GOVERNMENT SUPPORT

This invention was made with Government support under contract number DE-FC07-07ID14778, awarded by the U.S. Department of Energy. The Government has certain rights in the invention.

BACKGROUND

Figure 1:
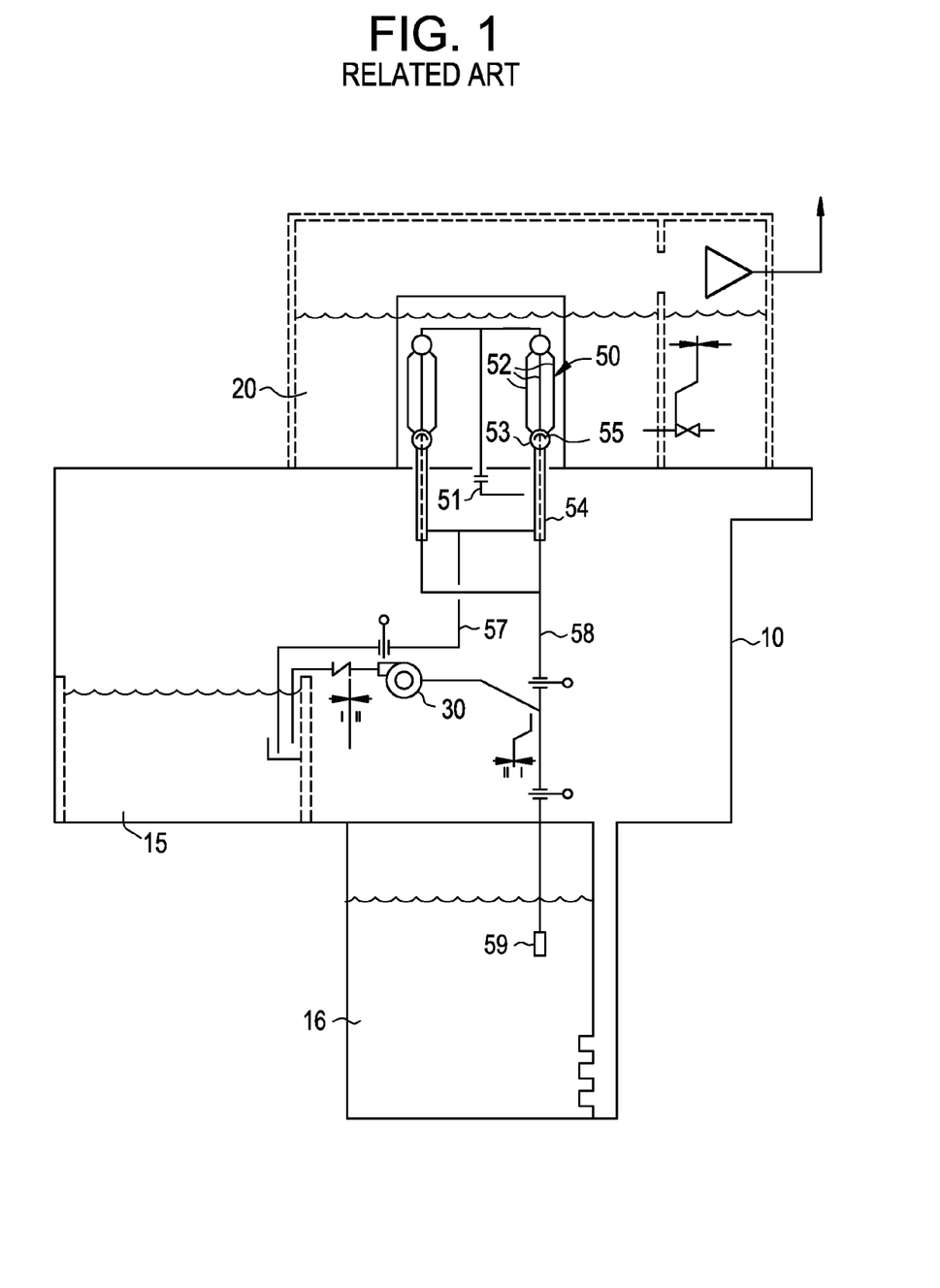
FIG. 1 is a schematic of a conventional ESBWR containment.

FIG. 1 is a cross-section schematic of a conventional containment building 10 cross section. Although containment 10 is shown in FIG. 1 having components and characteristics of an Economic Simplified Boiling Water Reactor (ESBWR), it is understood that components described therein are usable with other plant configurations. As shown in FIG. 1, containment 10 may include a gravity-driven coolant system (GDCS) 15, which may be a large, water-filled tank used to cool a reactor vessel in the event of a loss of primary coolant. A suppression pool 16 may be within containment 10 and used to condense steam from the reactor vessel and relieve pressure in the event of an accident. Several Passive Containment Cooling System (PCCS) condensers 50 are arranged in a PCCS pool 20, outside of containment 10. The PCCS condensers 50 remove additional heat and condense steam within containment 10 during a loss of coolant accident within the containment 10.

PCCS condensers 50 include an inlet 51 within containment 10 that receives steam and noncondensable gasses that may be released into containment 10 during a severe accident. The steam is formed from boiling coolant in the reactor, and the noncondensable gasses, such as $O_2$ and $H_2$, accumulate within the reactor and containment 10 during operation of the nuclear plant from radiation and chemical release. The steam and noncondensable gasses pass through inlet 51 of PCCS condenser 50 into branched pipes and vertical tubes 52, which are submerged in the PCCS pool 20. Heat from the steam and noncondensable gasses is transferred from vertical tubes 52 to PCCS pool 20, and steam within vertical tubes 52 condenses into water. Lower headers 53 collect the condensed water and noncondensable gasses in the PCCS condenser 50.

From lower header 53, the condensed water is driven by gravity and a pressure differential downward through an annular duct 54, which includes two concentric pipes that provide an inner and outer passage in annular duct 54. Condensed water flows through the outer pipe of annular duct 54 into a shared drain line 57, which drains the condensed water into GDCS pool 15. From the lower header 53, noncondensable gasses flow downward through the inner passage 54a (FIG. 2) in annular duct 54 into vent line 58, which terminates at a sparger 59 in suppression pool 16. A fan 30 may be connected to the vent line 58 to enhance noncondensable flow out of PCCS condensers 50.

Figure 2:
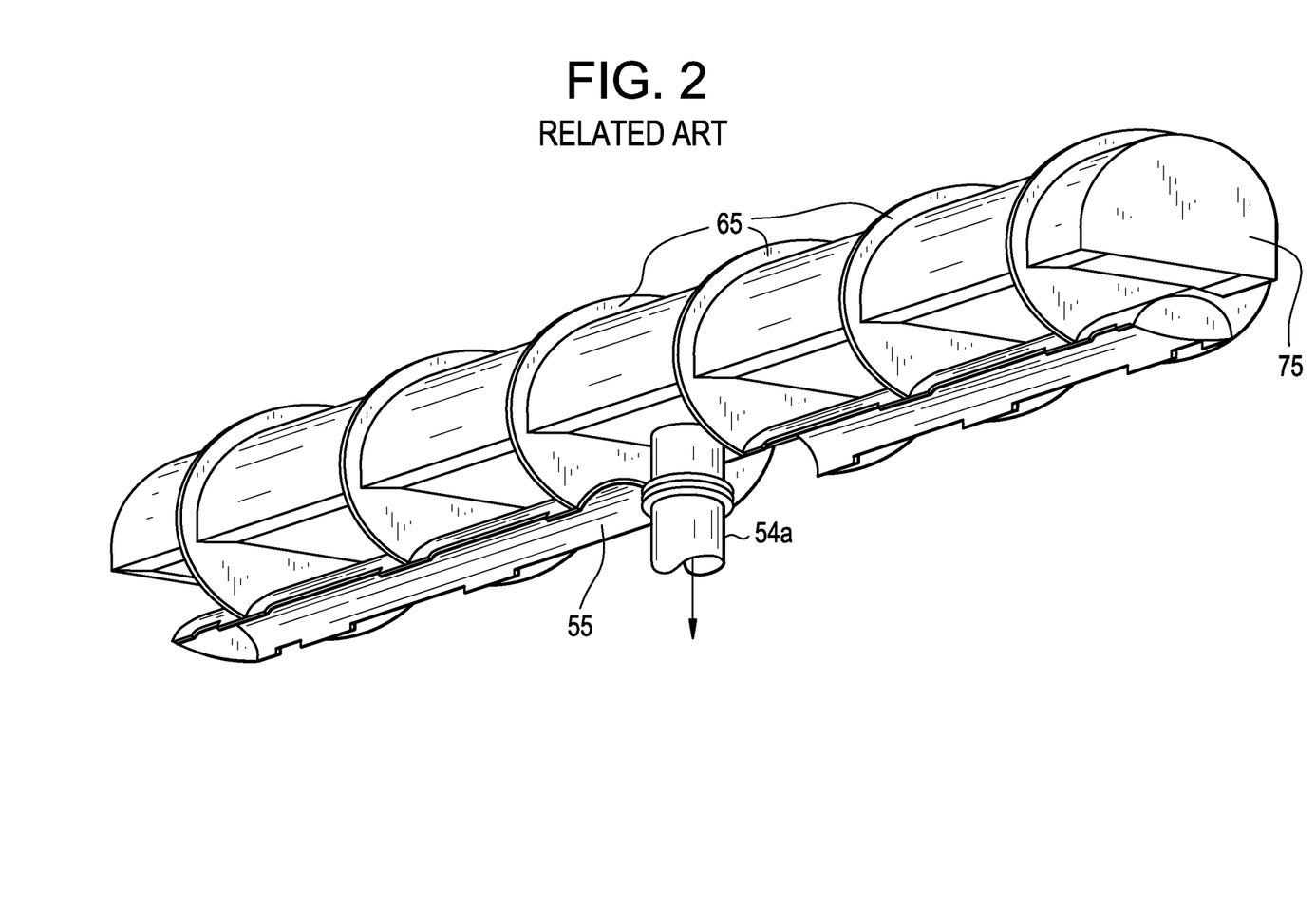
FIG. 2 is an illustration of a conventional drain manifold.

The lower header 53 includes a drain manifold 55 that separates condensed water and noncondensable gasses into the outer and inner passages, respectively, of the annular duct 54. FIG. 2 is an illustration of conventional drain manifold 55. As shown in FIG. 2, drain manifold 55 includes a vent hood/drip hood 75 that diverts condensed water flowing downward onto the drip hood 75 to either side of drain manifold 55. Several compression wave baffles 65 brace and secure drain manifold 55 in lower header 53. Noncondensable gasses are permitted to flow up into drip hood 75 and into inner passage 54a of annular duct 54, while the diverted condensed water flows into the outer passage about the edges of annular duct 54. In this way, the water may flow back into GDCS pool 15 for use as reactor coolant without any noncondensable gasses causing blocked or reverse flow.

SUMMARY

Example embodiments are directed to systems for passively eliminating noncondensable gasses from facilities susceptible to damage from combustion of built-up noncondensable gasses, such as $H_2$ and $O_2$ in nuclear power plants, without the need for external power and/or moving parts. Example systems include catalyst materials installed in areas subject to noncondensable gas exposure, where the catalyst material catalyzes a reaction in the noncondensable gas to an inert byproduct. Example systems may include catalyst plates installed in a lower header of the Passive Containment Cooling System (PCCS) condenser, a catalyst packing member, and/or a catalyst coating on an interior surface of a condensation tube of the PCCS condenser or an annular outlet of the PCCS condenser. Example systems may include structures with surfaces or hydrophobic elements that inhibit water formation and promote contact with the noncondensable gas.

Example methods are directed to passively eliminating noncondensable gasses in a nuclear power plant by installing and using example embodiment catalyst systems individually or in combination. Example methods may further include increasing an operating pressure of the PCCS condenser to facilitate recombination of noncondensable gasses therein.

DETAILED DESCRIPTION

Hereinafter, example embodiments will be described in detail with reference to the attached drawings. However, specific structural and functional details disclosed herein are merely representative for purposes of describing example embodiments. The example embodiments may be embodied in many alternate forms and should not be construed as limited to only example embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected," "coupled," "mated," "attached," or "fixed" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

As used herein, the singular forms "a", "an" and "the" are intended to include the plural forms as well, unless the language explicitly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures or described in the specification. For example, two figures or steps shown in succession may in fact be executed substantially and concurrently or may sometimes be executed in the reverse order or repetitively, depending upon the functionality/acts involved.

The inventors of the present application have identified that large amounts of noncondensable gasses may directly enter passive coolant features in nuclear power plants during an accident involving a loss of coolant. Such noncondensable gasses may be reactive, especially in high-temperature, high-pressure settings. Ignition of noncondensable gasses in an enclosed structure, such as those found in passive coolant features, may be especially damaging to those and surrounding structures. This damage may further compound an accident scenario. Example embodiments and methods discussed below uniquely address these previously-unidentified dangers recognized in passive coolant features and provide several advantages, including increased risk mitigation during accident scenarios, for example.

Example embodiments include catalyst materials positioned/installed within structures that are likely to be exposed to or contain noncondensable gasses and features susceptible to damage from noncondensable gas ignition. The catalyst materials may permit reaction of noncondensable gasses in a continuous and nondestructive manner into inert or useful products, thereby reducing risk of explosion and reducing gas pressure within an air-tight containment structure. Catalysts may be placed and configured to especially address areas most susceptible to explosive damage, most exposed to noncondensable gasses during normal operations or accident scenarios, and/or most accessible to passive heat transfer to eliminate heat energy from recombination of noncondensable gasses.

Figure 3:
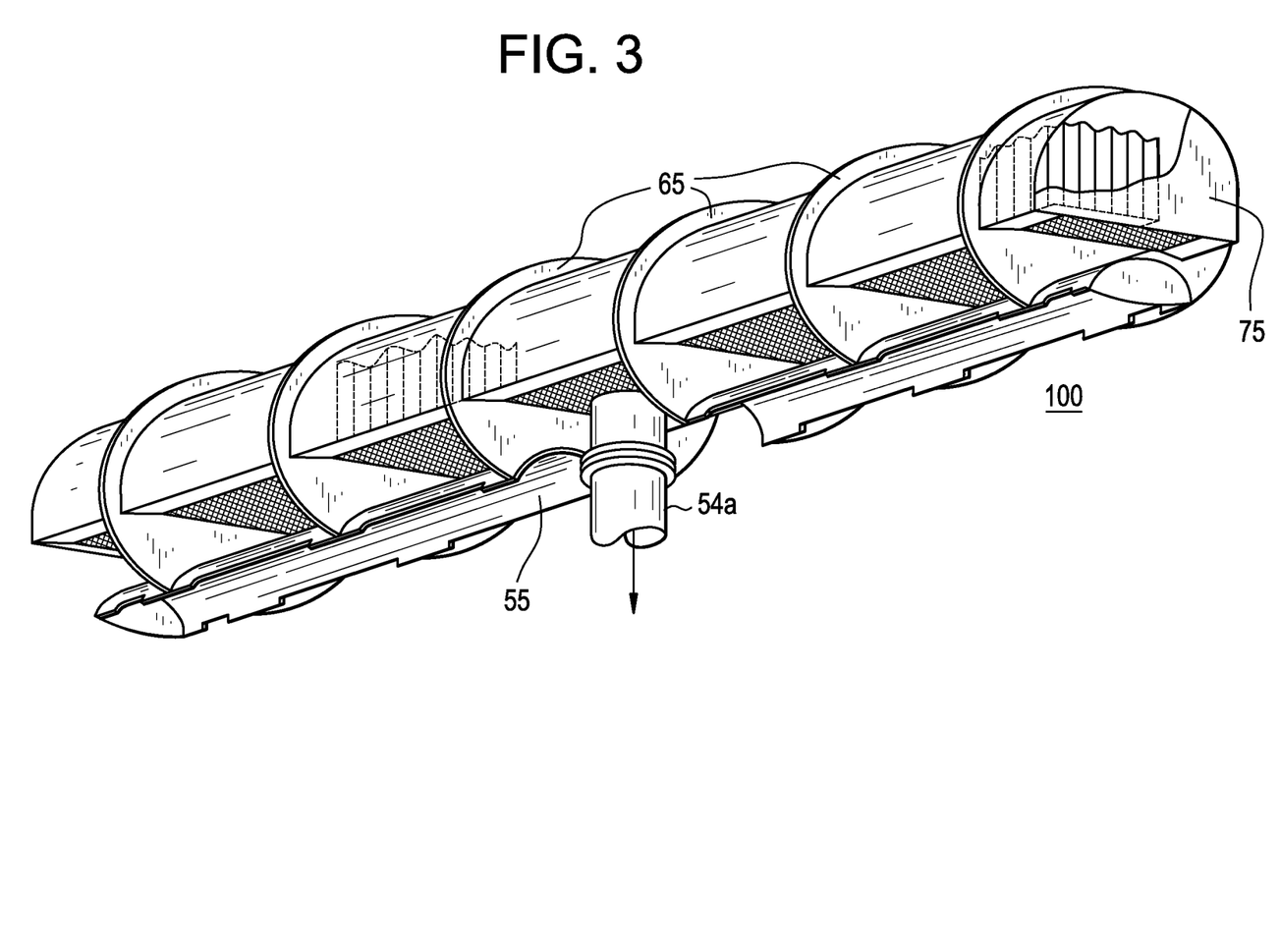
FIG. 3 is an illustration of an example embodiment catalyst system.

FIG. 3 is an illustration of an example embodiment catalyst system 100 useable in a drain manifold 55 conventionally found in a PCCS condenser 50 (FIG. 1). Example embodiment system 100 may include one or more support meshes 110 installed at a bottom of drip hood 75. Support meshes 110 may be any supporting structure that permits fluid flow through support meshes 110, including gridded wire, perforated plates, a solid filter, etc. Each support mesh 110 may sit between two compression wave baffles 65 so as to form partial or full compartments within drip hood 75.

One or more catalyst plates 105 are positioned within drip hood 75 of drain manifold 55. The catalyst plates 105 may sit on one or more support meshes 110 or may be otherwise affixed within drip hood 75. Catalyst plates are sized to fit within drain manifold 55 and may, for example, extend an entire length of drain manifold 55 or may be sized to fit within an individual compartment between two compression wave baffles 65. As shown in FIG. 3, if catalyst plates 105 fit within a single compartment between compression wave baffles 65, one or more sets of catalyst plates 105 may be in different compartments. Catalyst plates 105 may be thin so as to accommodate multiple catalyst plates 105 within drip hood 75 and increase surface area of catalyst plates 105. Catalyst plates 105 may be separated or intersecting. Catalyst plates 105 may include a wavy or corrugated surface that increases surface area and promotes liquid drainage off of catalyst plates 105 and promotes noncondensable gas contact and interaction with a catalyst material therein. Or, for example, catalyst plates 105 may have flat, perforated, bumpy, spiky, tabbed, veined, and/or any other type of desired surface.

Catalyst plates 105 and potentially support mesh 110 include catalyst materials that encourage the non-explosive reaction or recombination of noncondensable gasses. For example, catalyst materials may be palladium (Pd) or a palladium alloy that promotes reaction of combustible noncondensable gasses, such as hydrogen ($H_2$) and/or oxygen ($O_2$), into water or other harmless oxides and/or hydrides. Other known catalysts, including platinum (Pt), rhodium (Rh), organic compounds, etc. are useable as the catalyst material in example system 100. Catalyst plates 105 and/or support meshes 110 may be fabricated entirely of the catalyst material or may be coated, matrixed, embedded, etc. with the catalyst material so as to conserve an amount of catalyst material required while maximizing catalyst material surface area.

Figure 4:
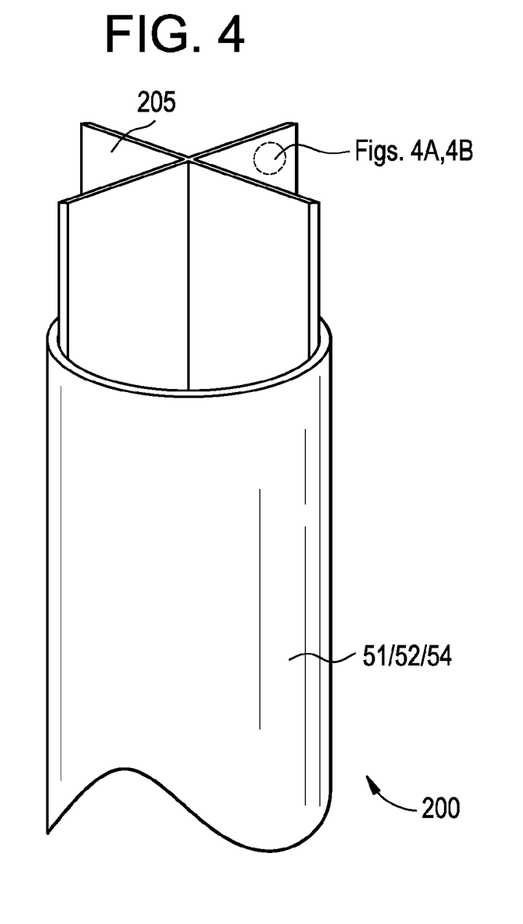
FIG. 4 is an illustration of another example embodiment catalyst system.

FIG. 4 is an illustration of another example embodiment catalyst system 200. As shown in FIG. 4, one or more catalyst packing members 205 are placed within pipes/tubes in a PCCS condenser 50 (FIG. 1). For example, catalyst packing members 205 may be placed in condenser inlet 51, branches and vertical tubes 52, and/or annular duct 54, each receiving and transmitting noncondensable gasses within the condenser 50 (FIG. 1). Catalyst packing members 205 may be retained in PCCS condenser structures by fastening, welding, friction, etc.

Catalyst packing members 205 may be cruciform, as shown in FIG. 4, with two or more intersecting plates that fill a cross-section of the structure into which catalyst packing members 205 are placed. Alternately, catalyst packing members 205 may be separated and parallel in any orientation within structure 51, 52, 54, etc. Catalyst packing members 205 may be thin so as to accommodate multiple catalyst packing members 205 within structure 51, 52, 54, etc. and increase surface area of catalyst packing members 205.

Figure 4A:
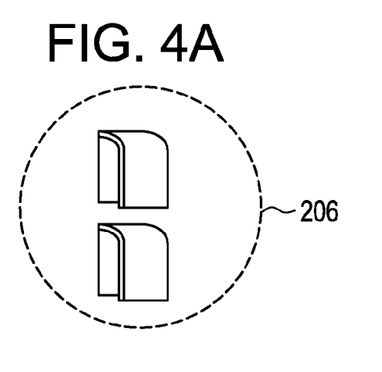
FIG. 4A is an illustration of a tabbed surface of FIG. 4, in accordance with an example embodiment.
Figure 4B:
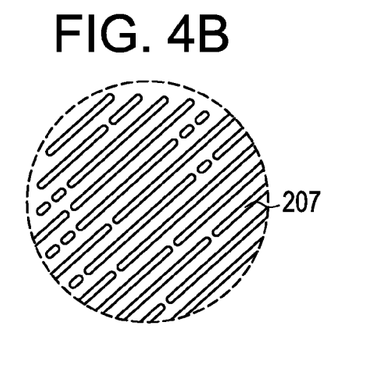
FIG. 4B is an illustration of a ridged surface of FIG. 4, in accordance with an example embodiment.

As shown in FIGS. 4A and 4B, catalyst packing members 205 may include several different surfaces that increase surface area and/or promote liquid drainage off of catalyst packing members 205, especially in the instance that catalyst packing members 205 are placed in inlet 51 or tubes 52 in direct contact with steam and condensate flowing into PCCS condenser 50 (FIG. 1). FIG. 4A illustrates a tabbed surface 206 that may promote liquid drainage off of tabs and away from a surface of the catalyst packing member 205. FIG. 4B illustrates a veined or ridged surface 207 that increases surface area and promotes liquid flow in channels off of catalyst packing member 205 and promotes noncondensable gas contact and interaction with a catalyst material therein. Or, for example, catalyst packing members 205 may have flat, perforated, bumpy, spiky and/or any other type of desired surface, with the understanding that some flow path within structures 51, 52, 54 is maintained and not completely blocked by a surface of catalyst packing members 205.

Catalyst packing members 205 include catalyst materials that encourage the non-explosive reaction of noncondensable gasses. For example, catalyst materials may be palladium (Pd) or a palladium alloy that promotes reaction of combustible noncondensable gasses, such as hydrogen ($H_2$) and/or oxygen ($O_2$), into water or other harmless oxides and/or hydrides. Other known catalysts, including platinum (Pt), rhodium (Rh), organic compounds, etc. are useable as the catalyst material in example system 200. Catalyst packing members 205 may be fabricated entirely of the catalyst material or may be coated, matrixed, embedded, etc. with the catalyst material so as to conserve an amount of catalyst material required while maximizing catalyst material surface area.

Figure 5:
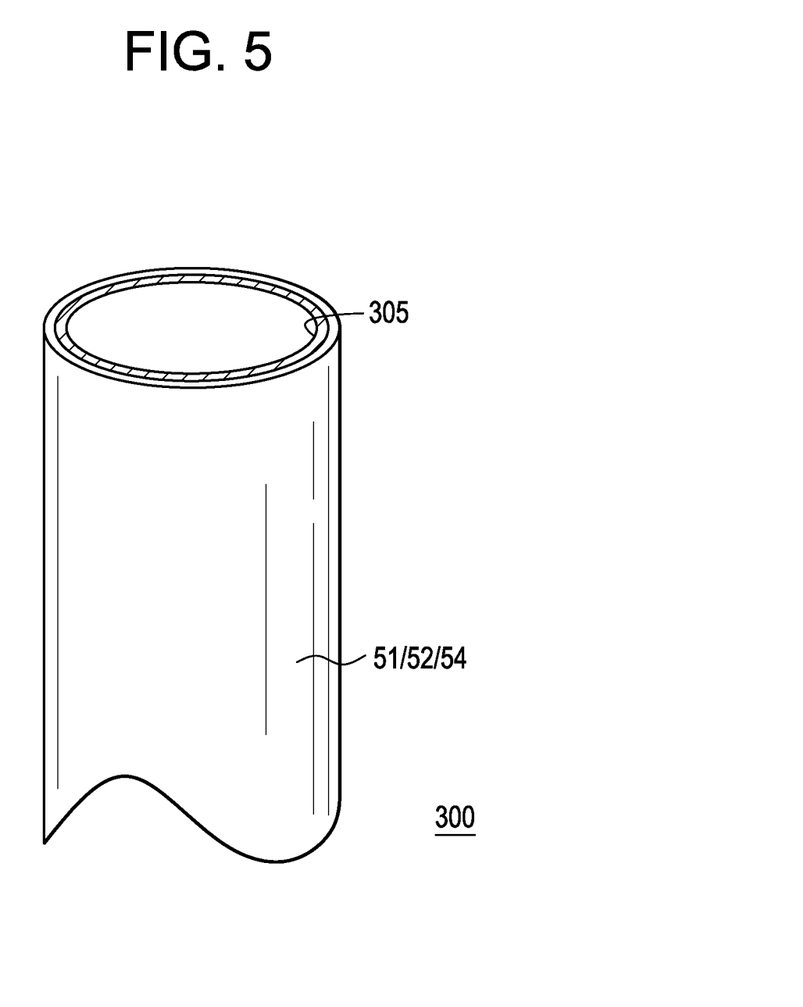
FIG. 5 is an illustration of a yet further example embodiment catalyst system.

FIG. 5 is an illustration of another example embodiment catalyst system 300. As shown in FIG. 5, a catalyst coating or liner 305 is coated/placed on a surface of pipes/tubes in a PCCS condenser 50 (FIG. 1). For example, catalyst coating 305 may be placed in condenser inlet 51, branches and vertical tubes 52, and/or annular duct 54, each receiving and transmitting noncondensable gasses within the condenser 50 (FIG. 1). Catalyst coating 305 may additionally be placed on interior surfaces of other PCCS structures, such as lower headers 53 (FIG. 1) or in other reactor structures receiving noncondensable gas flow and/or particularly vulnerable to noncondensable gas explosive damage.

Catalyst coating 305 may be in the form of a liner attached or frictionally sitting in structure 51, 52, 54, etc. or, for example, may be a chemical coating deposited on a surface of structure 51, 52, 54, etc. Catalyst coating 305 may be thin so as to accommodate flow through structures 51, 52, 54, etc. Catalyst coating 305 may include several different surfaces that increase surface area and/or promote liquid drainage off of catalyst coating 305, especially in the instance that catalyst coating 305 is placed in inlet 51 or tubes 52 in direct contact with steam and condensate flowing into PCCS condenser 50 (FIG. 1). For example, catalyst packing members 205 may have flat, perforated, bumpy, spiky, tabbed, veined, and/or any other type of desired surface, with the understanding that some flow path within structures 51, 52, 54 is maintained and not completely blocked by catalyst coating 305. Catalyst coating 305 may also include a hydrophobic element that repels steam and/or facilitates the removal of condensed water from catalyst coating 305 and promotes noncondensable gas contact and interaction with a catalyst material therein. For example, an electrostatically-applied fluoropolymer such as Teflon may be applied to areas with catalyst coating 305.

Catalyst coating 305 includes catalyst materials that encourage the non-explosive reaction of noncondensable gasses. For example, catalyst materials may be palladium (Pd) or a palladium alloy that promotes reaction of combustible noncondensable gasses, such as hydrogen ($H_2$) and/or oxygen ($O_2$), into water or other harmless oxides and/or hydrides. Other known catalysts, including platinum (Pt), rhodium (Rh), organic compounds, etc. are useable as the catalyst material in example system 300. Catalyst coating 305 may be fabricated entirely of the catalyst material or may be coated, matrixed, embedded, etc. with the catalyst material so as to conserve an amount of catalyst material required while maximizing catalyst material surface area.

Figure 6A:
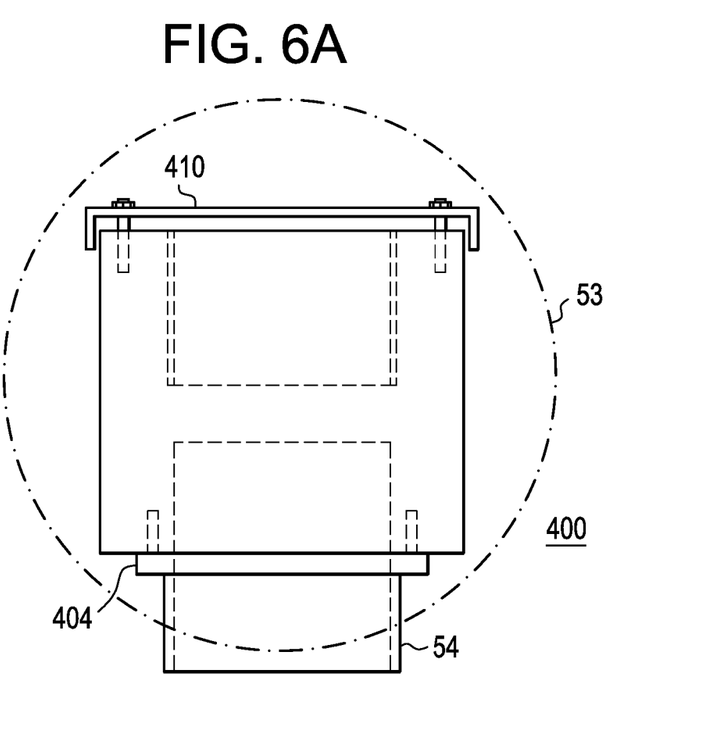
FIG. 6A is an illustration of an additional example embodiment catalyst system for use in a vent line.
Figure 6B:
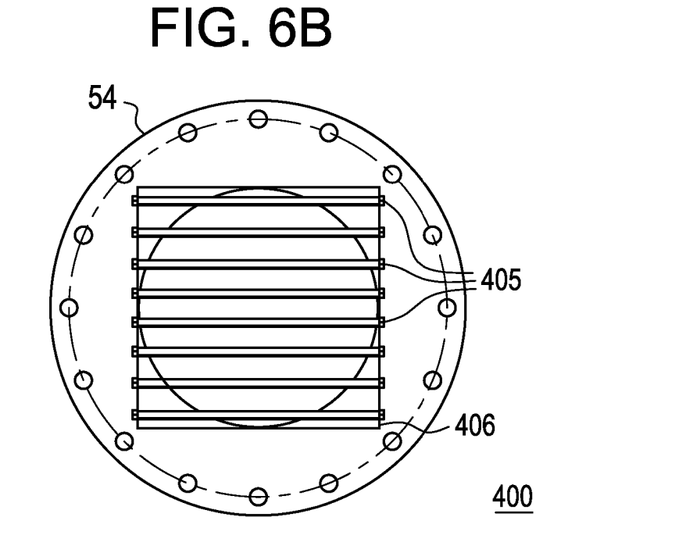
FIG. 6B is a top view of the example embodiment catalyst system of FIG. 6A with a cap removed for clarity.

FIGS. 6A and 6B are illustrations of an additional example embodiment catalyst system 400 adapted for use in vent line 54. Positioning catalyst system 400 within a vent line may be provide direct contact between catalyst materials and noncondensable gasses with minimum risk of condensate presence or blocking within vent line 54. Further, positioning within vent line 45 provides example embodiment system 400 with stable access to noncondensable gasses without risk of damage to catalyst system 400 if noncondensable gas ignition occurs in lower header 53.

As shown in FIGS. 6A and 6B example embodiment catalyst system 400 includes a plurality of catalyst plates 405 spaced at an inlet of vent line 54, above a flange 404 where the vent line 54 extends outside of lower header 53. Catalyst plates 405 may be spaced at regular intervals and held in constant position within a frame 406 so that catalyst plates are readily inserted into a top portion of vent line 54. Catalyst plates 405 may be thin so as to accommodate multiple catalyst plates 405 within vent line 54 and increase surface area of catalyst plates 405. Catalyst plates 405 may include a wavy or corrugated surface that increases surface area and promotes liquid drainage off of catalyst plates 405 and promotes noncondensable gas contact and interaction with a catalyst material therein. Or, for example, catalyst plates 405 may have flat, perforated, bumpy, spiky, tabbed, veined, and/or any other type of desired surface.

Catalyst plates 405 include catalyst materials that encourage the non-explosive reaction or recombination of noncondensable gasses. For example, catalyst materials may be palladium (Pd) or a palladium alloy that promotes reaction of combustible noncondensable gasses, such as hydrogen ($H_2$) and/or oxygen ($O_2$), into water or other harmless oxides and/or hydrides. Other known catalysts, including platinum (Pt), rhodium (Rh), organic compounds, etc. are useable as the catalyst material in example system 100. Catalyst plates 405 may be fabricated entirely of the catalyst material or may be coated, matrixed, embedded, etc. with the catalyst material so as to conserve an amount of catalyst material required while maximizing catalyst material surface area.

Example embodiment catalyst system 400 may further include a hood or cap 410 that aids in preventing liquid or condensate from entering example embodiment system 400 from the lower header 53, such that catalyst plates 405 will remain substantially dry and in contact with noncondensable gasses flowing over the plates. Cap 410 may join to a top of vent line 54 but permit gas flow into the vent line, as shown in FIG. 6A. Cap 410 may further prevent damage to catalyst plates 405 aligned within vent line 54 in the instance of gas ignition within lower header 53 or other part of PCCS condenser 50 (FIG. 1). Cap 410 and catalyst plates 405 within modular frame 406 may be easily removable together from vent line 54 for installation/repair/inspection/etc. For example, cap 410 may screw onto flange 404 and catalyst plates 405 and any frame 406 may sit within a top portion of vent line 54 under cap 410.

While example embodiment systems position catalyst materials within a PCCS condenser 50 (FIG. 1) of a nuclear plant, it is understood that other locations in conventional plants or in future-developed plants are useable with example systems. Such locations, including a PCCS condenser, may be especially likely to be damaged by uncontrolled noncondensable gas reaction, uniquely exposed to noncondensable gas flow or buildup, and/or positioned to safely eliminate heat energy from recombination of noncondensable gasses. The PCCS condenser 50 may possess several of these characteristics because of its position and function in receiving released noncondensable gasses in a nuclear power plant, such that example embodiment catalyst systems within a PCCS condenser may recombine a large portion of noncondensable gasses released in a nuclear plant, reducing explosion potential and gas pressure within containment. Heat released through recombination in example embodiment systems may be readily transferred from PCCS condenser 50 to the PCCS pools 20. Additionally, example embodiment systems may receive and recombine large proportions of released noncondensable gasses without any additional outside power source or forced gas flow.

Example methods include installing one or more example embodiment catalyst systems in a PCCS condenser or other eligible piece of equipment in known or future facilities that may benefit from passive noncondensable recombination and elimination, such as an ESBWR. Example embodiments 100, 200, and/or 300 may be installed individually and in various combinations based on a particular plant's design needs. Such installation may occur during plant construction, during equipment construction or delivery, and/or following construction during operations, such as during a fuel outage.

Because example embodiment systems and methods of using the same enhance elimination of noncondensable gasses, plant operation may be modified to take advantage of the enhanced elimination. Example methods include operating a PCCS condenser 50 having one or more example embodiment catalyst systems 100, 200, and/or 300 installed therein at an increased pressure. The increased pressure in combination with example embodiments may further encourage noncondensable recombination and heat transfer from PCCS condenser 50. Increased pressure may be achieved by increasing containment 10 pressure and/or narrowing pipes 52, 54, etc. within PCCS condenser 50, for example.

Example embodiments and methods thus being described, it will be appreciated by one skilled in the art that example embodiments may be varied through routine experimentation and without further inventive activity. Variations are not to be regarded as departure from the spirit and scope of the example embodiments, and all such modifications as would be obvious to one skilled in the art are intended to be included within the scope of the following claims.

What is claimed is:

1. A system for passively eliminating noncondensable gasses in a nuclear power plant, the system comprising:
    a catalyst material in an area subject to noncondensable gas exposure, the catalyst material configured to catalyze a reaction in the noncondensable gas to an inert byproduct, wherein the area is located in a condensate outlet exiting an inlet header of a passive containment cooling system (PCCS) condenser, the inlet header being configured to be submerged in a coolant fluid in the PCCS condenser during operation of the system.

2. The system of claim 1, wherein the area is at least one of a condensation tube of a PCCS condenser and an annular outlet of the PCCS condenser, and wherein the system further comprises:
    at least one of a catalyst packing member positioned within the area and a catalyst coating on an interior surface of the area, the at least one of the catalyst packing member and the catalyst coating including the catalyst material.

3. The system of claim 2, wherein the catalyst packing member includes at least one pair of cruciform plates spanning a cross-section of the area.

4. The system of claim 2, wherein the catalyst coating is one of a chemical layer deposited on the interior surface and a liner attached to the interior surface, and wherein the catalyst coating includes a hydrophobic element.

5. The system of claim 2, wherein the catalyst packing member includes a surface with at least one of tabs and ridges to promote contact with the noncondensable gas.

6. The system of claim 1, wherein the area is a vent line in an annular outlet of the PCCS condenser, and wherein the system further comprises:
    at least one catalyst plate positioned within the vent line, the at least one of the catalyst plate including the catalyst material; and
    a cap on the vent line over the at least one catalyst plate, the cap preventing condensed fluid flow onto the catalyst plate but permitting noncondensable gas flow onto the catalyst plate.

7. A method of passively eliminating noncondensable gasses in the system of claim 1, the method comprising:
    installing at least one catalyst plate under a drip hood in the PCCS condenser in the nuclear power plant; and
    at least one of,
        installing the catalyst material in the area that is the condensate outlet exiting the inlet header of the PCCS condenser, the catalyst material being at least one catalyst packing member, the area being at least one of a condensation tube of the PCCS condenser and an annular outlet of the PCCS condenser, and
        coating an interior surface of at least one of the condensation tube and the annular outlet with a catalyst coating, the catalyst coating, the catalyst packing member, and the at least one catalyst plate being capable of catalyzing a reaction in the noncondensable gasses.

8. The method of claim 7, wherein the catalyst material is at least one of palladium, palladium, and rhodium.

9. The method of claim 7, wherein the at least one catalyst plate includes a corrugated surface, and wherein the at least one catalyst packing member includes a ridged surface to promote contact with the noncondensable gas.

10. The method of claim 7, wherein the installing the at least one catalyst plate and the installing the at least one catalyst packing member are executed during a fuel cycle outage in the nuclear power plant.

11. The method of claim 7, further comprising:
    increasing the operating pressure of the PCCS condenser.

* * * * *